United States Patent [19]

Benzschawel et al.

[11] Patent Number: 5,341,153
[45] Date of Patent: Aug. 23, 1994

[54] METHOD OF AND APPARATUS FOR DISPLAYING A MULTICOLOR IMAGE

[75] Inventors: Terry L. Benzschawel, Ossining; Webster E. Howard, Yorktown Heights, both of N.Y.

[73] Assignee: International Business Machines Corporation, Armonk, N.Y.

[21] Appl. No.: 205,961

[22] Filed: Jun. 13, 1988

[51] Int. Cl.⁵ .............................................. G09G 1/28
[52] U.S. Cl. ...................................... 345/152; 345/88; 345/138
[58] Field of Search ............... 340/703, 702, 701, 728, 340/784, 793; 358/56, 59, 166; 382/27; 359/53, 55, 56, 59; 395/131; 345/88, 136, 137, 138, 150, 151, 152

[56] References Cited

U.S. PATENT DOCUMENTS

| | | | |
|---|---|---|---|
| 3,843,959 | 10/1974 | Omaki et al. | 358/59 |
| 4,386,349 | 5/1983 | Granberg et al. | 340/723 |
| 4,432,009 | 2/1984 | Reitmeier et al. | 358/22 |
| 4,437,122 | 3/1984 | Walsh et al. | 358/166 |
| 4,630,307 | 12/1986 | Cok | 340/728 |
| 4,652,912 | 3/1987 | Masubuchi | 358/59 |
| 4,771,279 | 9/1988 | Hannah | 340/801 |

FOREIGN PATENT DOCUMENTS 0300509 11/1989 European Pat. Off. ........ C09G 1/16

OTHER PUBLICATIONS

"Miniatur-Flachbildschirme", radio fernsehen elektronik, Berlin 34 (1985) pp. 253-254.
Axford, J. G. "Interleaved Smoothing Raster for Vector CRT Displays". *IBM Tech. Disclosure Bull.*, vol. 19, No. 11, pp. 4412-4414 (Apr. 1977).
Crow. F. C. "The Aliasing Problem in Computer-Generated Shaded Images". *Communications of the ACM*, vol. 20, No. 11, pp. 799-805 (Nov. 1977).
Gupta, S., et al., "Anti-Aliasing Characters Displayed By Text Terminals", *IBM Tech. Disclosure Bull.*, vol. 25, No. 12, pp. 6434-6436 (May 1983).
Tsuruta, S., et al., "Color Pixel Arrangement Evaluation For LC-TV." 1985 *International Display Research Conference*, pp. 24 to 26.

*Primary Examiner*—Richard Hjerpe
*Assistant Examiner*—Steven J. Saras
*Attorney, Agent, or Firm*—Marc D. Schechter; Robert P. Tassinari, Jr.

[57] ABSTRACT

A method of displaying a high resolution multicolor image on a lower resolution display. The image comprises a plurality of image pixels containing at least first and second image subpixels having first and second colors. The image is displayed on a display having display pixels comprising at least first and second spatially offset display subpixels capable of displaying the first and second colors, respectively. In the method, the first display subpixel is displayed with an intensity which is a function of the intensities of at least two first image subpixels having positions extending over a first region having an area greater than the area of the first display subpixel. The first region is approximately centered on the position of the first display subpixel. A second display subpixel is displayed with an intensity which is a function of the intensities of at least two second image subpixels having positions extending over a second region having an area greater than the area of the second display subpixel. The second region is approximately centered on the position of the second display subpixel. By using a different centered region for each separate subpixel of a composite RGB display picture element in transforming a high resolution multicolor image to a lower resolution display, higher quality images are produced as compared to using a single region for each composite RGB display picture element.

43 Claims, 5 Drawing Sheets

METHOD OF AND APPARATUS FOR DISPLAYING A MULTICOLOR IMAGE

BACKGROUND OF THE INVENTION

The invention relates to multicolor displays constructed, for example, from discrete red, green, and blue picture elements. For example, the invention relates to multicolor liquid crystal displays.

Pixel arrangements for color liquid crystal displays are described, for example, in an article by S. Tsuruta et al entitled 37 Color Pixel Arrangement Evaluation for LC-TV" (1985 *International Display Research Conference,* pages 24-26). Such displays consist of a large number of picture elements (pixels), where each pixel consists of three to six color subpixels.

Tsuruta et al describe several pixel configurations. In one case, each pixel consists of a rectangular area formed by arranging a red, a green, and a blue subpixel in a horizontal line. Identical pixels are repeated in vertical columns and horizontal rows.

In another case, each pixel consists of a rectangular area formed by a red subpixel, a green subpixel, and a blue subpixel in a horizontal line, or a blue subpixel, a red subpixel, and a green subpixel in a horizontal line, or a green subpixel, a blue subpixel, and a red subpixel in a horizontal line. The three different pixel configurations are arranged in the display in alternating rows.

In a third arrangement of Tsuruta et al, each pixel consists of a red subpixel, a blue subpixel, and a green subpixel arranged in a triangular format. Finally in a fourth arrangement, each pixel consists of one red subpixel, one blue subpixel, and two green subpixels arranged in a two-by-two square.

Normally, the image information to be displayed has a much higher resolution than does the display device on which the image is to appear. Such high resolution image information is obtained, for example, synthetically (by computer generation), or from a high resolution image sensor.

Because the image resolution is higher than the display resolution, a number N of image pixels will correspond to a single display pixel. Consequently, in displaying image information on such a color liquid crystal display, it has been known to process the image by associating N image picture elements with each display picture element.

Thus, the attributes of a display pixel were determined by averaging the attributes of the N image pixels corresponding in location to the display pixel. More specifically, the red intensity of the display pixel was determined by averaging the red intensity of the corresponding N image pixels. Similarly, the blue intensity of the display pixel was determined by averaging the blue intensities of the N corresponding image pixels, and the green intensity of the display pixel was determined by averaging the green intensities of the corresponding N image pixels.

A problem with the known method of displaying a color image on a color liquid crystal display was that the images suffered from blurring. Moreover, the edges of objects in the displayed image contained spurious coloration.

SUMMARY OF THE INVENTION

It is an object of the invention to provide a method of and apparatus for displaying a multicolor image which provides sharper quality text and graphic images on multicolor displays, with reduced spurious coloration.

More specifically, it is an object of the invention to compensate for the offset between red, green, and blue picture elements in a multicolor display constructed from discrete red, green, and blue picture elements, in order to produce images of higher quality.

In the method of and apparatus for displaying a multicolor image according to the present invention, the image has a first density of image pixels. Each image pixel comprises at least first and second image subpixels having first and second different colors, respectively. A display is provided having a density of display pixels which is less than or equal to the density of pixels in the image. Each display pixel comprises at least first and second spatially offset display subpixels capable of displaying the first and second colors, respectively.

According to the invention, a first display subpixel is displayed with an intensity which is a function of the intensities of at least two first image subpixels having positions extending over a first region. The first region has an area greater than the area of the first display subpixel. The first region is approximately centered on the position of the first display subpixel.

Moreover, a second display subpixel is displayed with an intensity which is a function of the intensities of at least two second image subpixels extending over a second region having an area greater than the area of the second display subpixel. The second region is approximately centered on the position of the second display subpixel.

The method of displaying a multicolor image according to the present invention is based upon the recognition that in prior displays image information from the closest neighboring image pixels was not considered in determining the intensity of each color subpixel of the display. While the prior method of displaying a multicolor image was adequate if the different color subpixels of the display were not offset, the prior method was deficient in displays with significant spatial offset between the different color subpixels of each display pixel.

Advantageously, the method according to the present invention compensates for the spatial offsets between the red, green, and blue subpixels of each display picture element to produce displays of higher quality. Consequently, the greater the ratio of the spatial offsets of the red, green, and blue subpixels to the size of the composite red/green/blue picture elements, the greater is the improvement in display sharpness and coloration resulting from the method according to the present invention.

In addition to improving image quality, the method of displaying a multicolor image according to the present invention can also be used to reduce aliasing. The method is useful in reducing aliasing, for example, when each image subpixel has only one of two intensity levels, and when each display subpixel is capable of being displayed in any one of at least three intensity levels.

In another aspect of the invention, each first display subpixel is displayed with an intensity which is a first function of the intensities of at least two first image subpixels extending over a first region associated with the first display subpixel. Each first region is approximately centered on the position of the associated first display subpixel. Similarly, each second display subpixel is displayed with an intensity which is a second function of the intensities of at least two second image subpixels extending over a second region associated with the second display subpixel. Each second region is approximately centered on the position of the associated second display subpixel.

The display may comprise, in addition to first and second spatially offset display subpixels, a third spatially offset subpixel for displaying a third color in the image. Each third display subpixel is displayed with an intensity which is a third function of the intensities of at least two third image subpixels extending over a third region associated with the third display subpixel.

The first, second, and third regions may have any suitable shape. For example, these regions may be T-shaped or they may be rectangularly shaped. Preferably, the first, second, and third regions have equal areas.

The first, second, and third functions (which relate the intensity of each display subpixel to the intensities of two or more image subpixels) may be, for example, weighted arithmetic mean functions. Alternatively, they may be other low-pass filter functions of the spatial distribution of the intensities of the image subpixels (so as to reduce aliasing).

As mentioned above, the display may be a liquid crystal in which the display subpixels are energized to transmit or reflect light incident thereon. Alternatively, the display may be a plasma panel, an electroluminescent panel in which the display subpixels are energized to emit light, or a multicolor printer.

While the different color subpixels of the display are spatially offset relative to one another, normally the different color subpixels of the image are spatially superimposed on each other.

It is preferred that in the method according to the present invention, the combination of all of the first regions extends over substantially the entire display, and the sum of the areas of all the first regions is substantially equal to the entire display area. Similarly, the combination of all the second regions extends over substantially the entire display, and the sum of the areas of all of the second regions is substantially equal to the display area. In this way, all available image information is utilized in constructing the displayed image.

DESCRIPTION OF THE PREFERRED EMBODIMENTS

Figure 1:
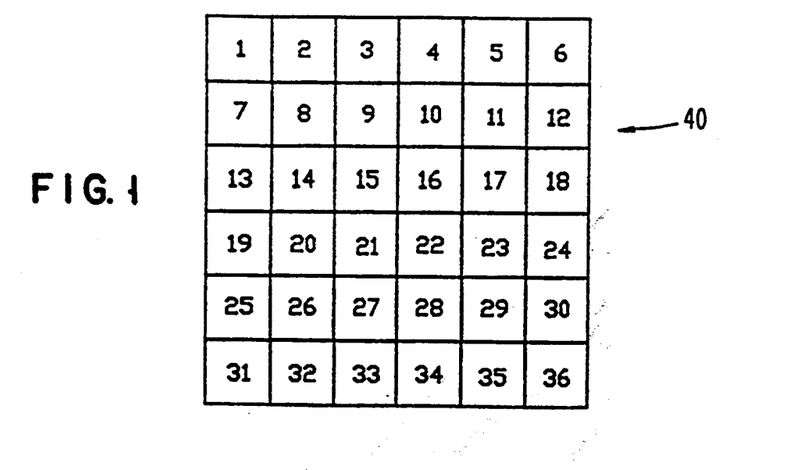
FIG. 1 schematically illustrates an arrangement of image picture elements (pixels).

The method of and apparatus for displaying a multicolor image according to the present invention starts with an image. Referring to FIG. 1, an image portion 40 has a first density of image pixels 1–36. Each image pixel 1–36 has a position in the image.

Each image pixel 1–36 of image 40 comprises at least first and second image subpixels. In the case of image 40, the first and second image subpixels of each pixel are spatially superimposed on each other. Each first image subpixel has a first color, and each second image subpixel has a second color different from the first color. Thus, for example, image pixel 1 comprises a red subpixel with an intensity $r_1$, and a green subpixel with an intensity $g_1$.

In the case of a tricolor image, each image pixel also comprises a third image subpixel spatially superimposed on the first and second image subpixels. The third image subpixel has a third color, for example blue. Image pixel 1 then also comprises a blue subpixel with an intensity $b_1$.

Figure 2:
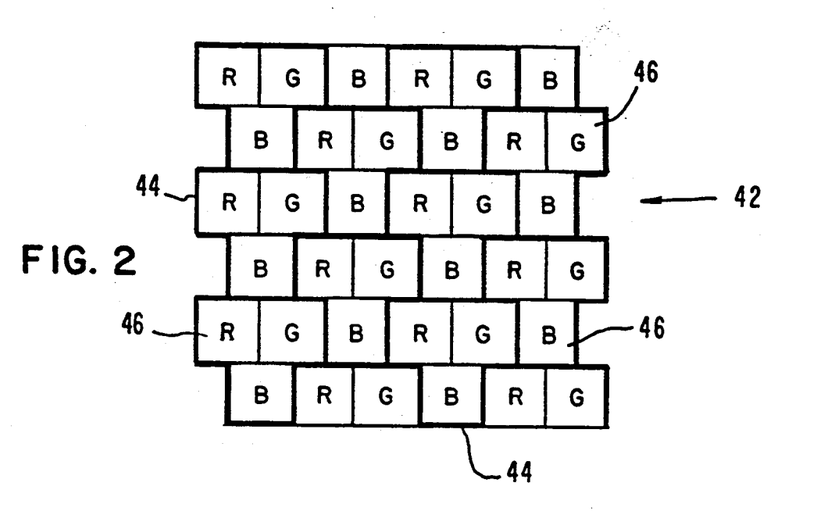
FIG. 2 schematically illustrates an arrangement of T-shaped display pixels, where each display pixel comprises spatially offset red, green, and blue display subpixels.

The method according to the present invention also utilizes a display as shown in FIG. 2. The display portion 42 of FIG. 2 has a second density of display pixels 44 less than or equal to the first density of image pixels 1–36 of FIG. 1. The density comparison between the image pixels and the display pixels is for an image and a display of equal size.

Each display pixel 44 shown in FIG. 2 comprises at least first and second spatially offset display subpixels 46. Each first display subpixel is capable of displaying the first color, and each second display subpixel is capable of displaying the second color.

In the example of FIG. 2, each display pixel 44 comprises three display subpixels 46. For example, the first display subpixels are display subpixels R for displaying red, the second display subpixels are the display subpixels G for displaying green, and the third display subpixels are the subpixels B for displaying blue. Each display subpixel has a position on the display and corresponds to an area of the display 42.

Figure 3:
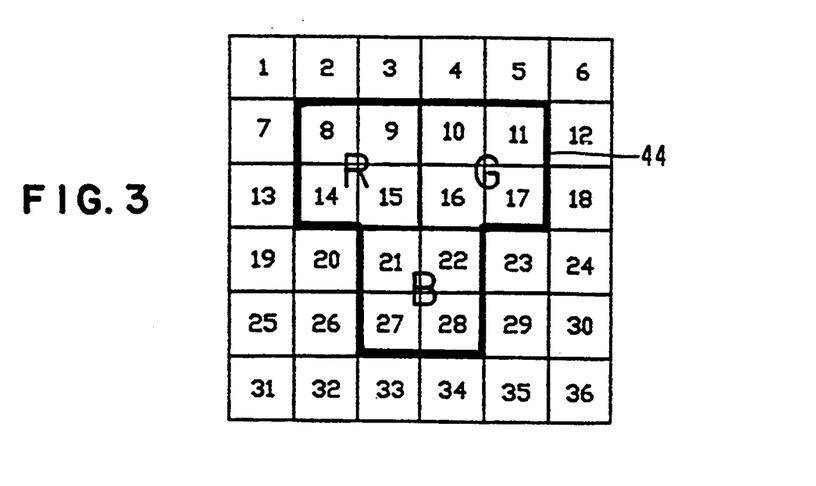
FIG. 3 schematically illustrates a display pixel of FIG. 2 superimposed on image pixels of FIG. 1.

FIG. 3 shows a display pixel 44 of display portion 42 superimposed on image pixels 1–36 of image portion 40 for a display and image of equal size. In FIG. 3, display pixel 44 covers the same area as twelve image pixels, and therefore the density of image pixels is twelve times greater than the density of display pixels.

Now, according to prior methods of displaying the multicolor image 40 on the display 42, the intensity of the display pixel 44 would be determined by averaging the intensities of the image pixels 8–11, 14–17, 21, 22, 27, and 28 which correspond in position to the display pixel. Thus, the intensity of the red subpixel R of display pixel 44 was given by $$\overline{R}_{8,9,14,15} = \frac{\sum_{i=8}^{11} r_i + \sum_{i=14}^{17} r_i + r_{21} + r_{22} + r_{27} + r_{28}}{12} \quad (1)$$

The intensity of the green display subpixel G was determined by $$\overline{G}_{10,11,16,17} = \frac{\sum_{i=8}^{11} g_i + \sum_{i=14}^{17} g_i + g_{21} + g_{22} + g_{27} + g_{28}}{12} \quad (2)$$

And the intensity of the blue display subpixel B was determined by $$\overline{B}_{21,22,27,28} = \frac{\sum_{i=8}^{11} b_i + \sum_{i=14}^{17} b_i + b_{21} + b_{22} + b_{27} + b_{28}}{12} \quad (3)$$

In equations 1, 2, and 3, $r_i$ is the intensity of the red subpixel of image pixel i, $g_i$ is the intensity of the green subpixel of image pixel i, and $b_i$ is the intensity of the blue subpixel of image pixel i.

While the prior method of displaying a multicolor image appeared to be satisfactory, the present invention is based upon the recognition that due to the spatial offset between the R, G, and B display subpixels of the display pixel 44, a sharper image with truer coloration can be produced by constructing each display subpixel from a different set of nearest neighbor image subpixels. Thus, for example, the red component of image subpixel 2 should contribute more to the intensity of the display subpixel R than should the red intensity of image subpixel 28. However, in the prior method the intensity of the red display subpixel R was based in part upon the red component of image subpixel 28 and was not based at all upon the intensity of the red component of the image subpixel 2.

Consequently, the method according to the present invention compensates for the offset between the red, green, and blue display subpixels R, G, and B in the display of the image.

Figure 4A:
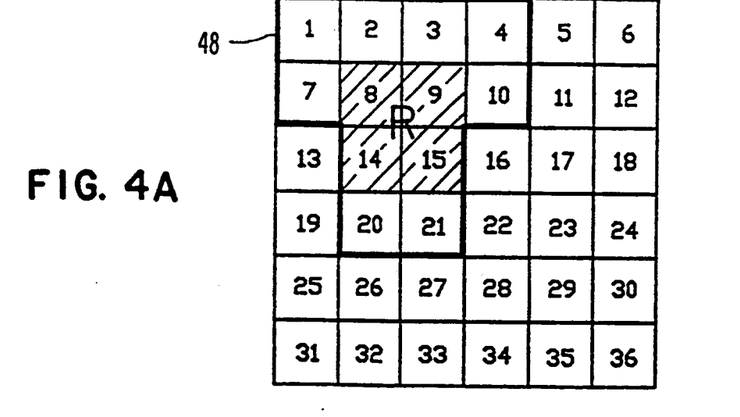
FIG. 4A schematically illustrates a first display subpixel and a first region of image subpixels associated with the first display subpixel.

Referring to FIG. 4A, according to the present invention a first display subpixel R of the display pixel 44 of FIG. 3 is now displayed with an intensity which is a function of the intensities of at least two (in this case twelve) first image subpixels having positions extending over a first region 48. Region 48 includes the red subpixels of image pixels 1-4, 7-10, 14, 15, 20 and 21.

The first region 48 thus has an area greater than the area of the first display subpixel R. However, as compared with the prior method, according to the present invention the first region 48 is approximately centered on the position of the first display subpixel R. The intensity of the first display subpixel R is, for example, $$\overline{R}_{8,9,14,15} = \frac{\sum_{i=1}^{4} r_i + \sum_{i=7}^{10} r_i + r_{14} + r_{15} + r_{20} + r_{21}}{12} \quad (4)$$

Figure 4B:
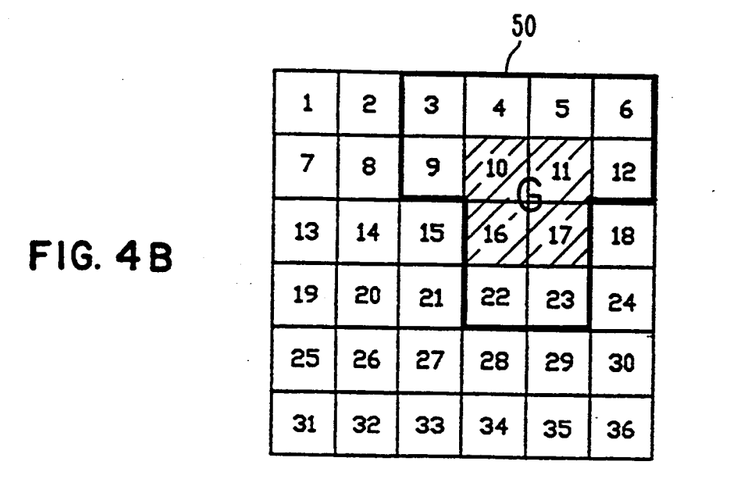
FIG. 4B schematically illustrates a second display subpixel and a second region of second image subpixels associated with the second display subpixel.

FIG. 4B shows a second display subpixel G. Display subpixel G is displayed with an intensity which is a function of the intensities of the green image subpixels having positions extending over a second region 50. Second region 50 contains the green image subpixels in image pixels 3–6, 9–12, 16, 17, 22, and 23. As shown in FIG. 4B, the second region 50 is approximately centered on the position of the second display subpixel G. Thus, the intensity of the second display subpixel G is given by $$\overline{G}_{10,11,16,17} = \frac{\sum_{i=3}^{6} g_i + \sum_{i=9}^{12} g_i + g_{16} + g_{17} + g_{22} + g_{23}}{12} \quad (5)$$

Figure 4C:
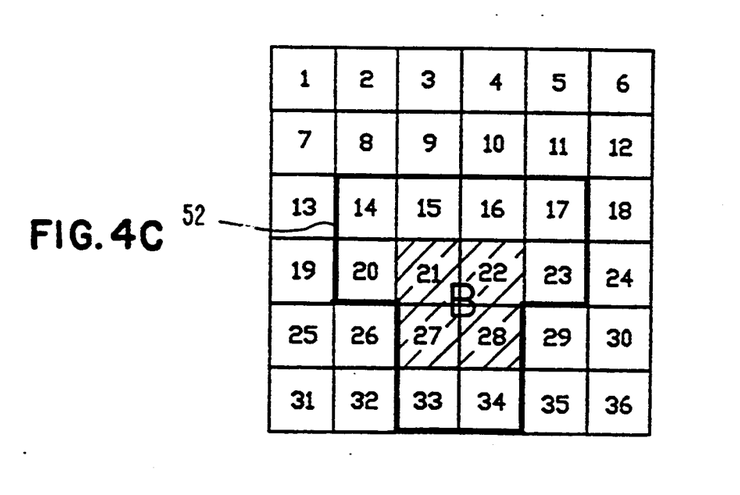
FIG. 4C schematically illustrates a third display subpixel and a third region of third image subpixels associated with the third display subpixel.

FIG. 4C shows a third display subpixel B of the display subpixel 44 of FIG. 3. Subpixel B is displayed with an intensity which is a third function of the intensities of the blue image subpixels contained in a third region 52. The third region 52 contains image pixels 14–17, 20–23, 27, 28, 33, and 34. The third region 52 has an area greater than the area of the associated display subpixel B and is approximately centered on the position of the associated display subpixel B. The intensity of the display subpixel B may be given by, for example, $$\overline{B}_{21,22,27,28} = \frac{\sum_{i=14}^{17} b_i + \sum_{i=20}^{23} b_i + b_{27} + b_{28} + b_{33} + b_{34}}{12} \quad (6)$$

Figure 5A:
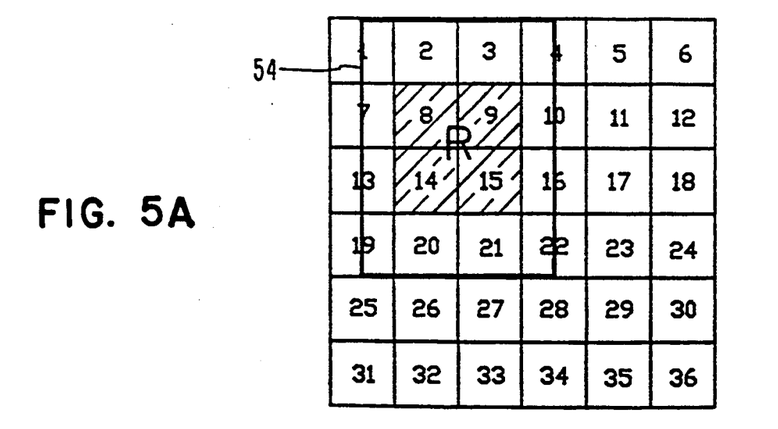
FIGS. 5A, 5B, and 5C illustrate alternative first, second, and third regions of image subpixels associated with first, second, and third display subpixels respectively.
Figure 5B:
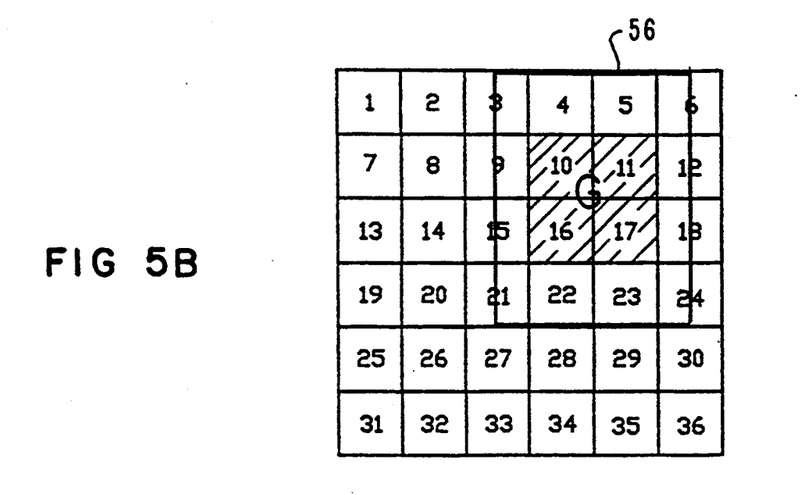
Figure 5C:
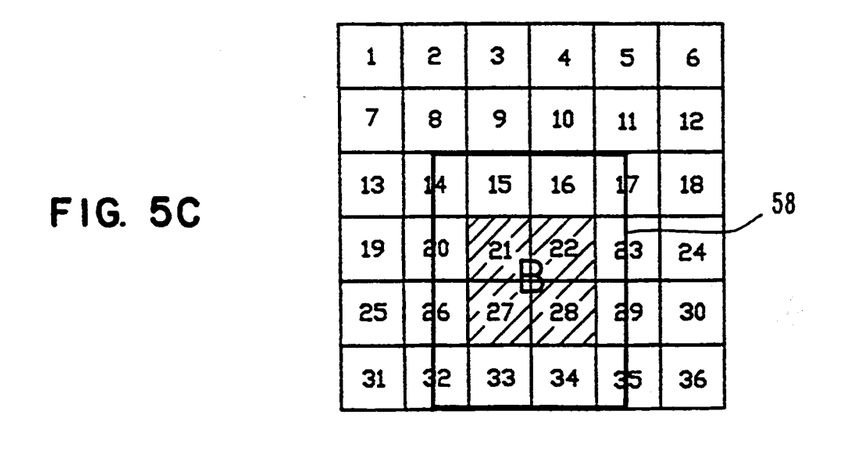

In FIGS. 4A, 4B, and 4C and equations (4), (5), and (6), the functions which determine the intensities of the display subpixels are arithmetic mean functions. FIGS. 5A, 5B, and 5C show alternative weighted mean functions. In FIGS. 5A, 5B, and 5C, the first region 54, the second region 56, and the third region 58 associated with the R display subpixel, the G display subpixel, and the B display subpixel respectively, are shown in bold outline. The intensities of the display subpixels are given by the following functions.

$$\overline{R}_{8,9,14,15} = \frac{r_2 + r_3 + r_8 + r_9 + r_{14} + r_{15} + r_{20} + r_{21}}{12} + \quad (7)$$

$$\frac{\frac{1}{2}(r_1 + r_4 + r_7 + r_{10} + r_{13} + r_{16} + r_{19} + r_{22})}{12}$$

$$\overline{G}_{10,11,16,17} = \frac{g_4 + g_5 + g_{10} + g_{11} + g_{16} + g_{17} + g_{22} + g_{23}}{12} + \quad (8)$$

$$\frac{\frac{1}{2}(g_3 + g_6 + g_9 + g_{12} + g_{15} + g_{18} + g_{21} + g_{24})}{12}$$

$$\overline{B}_{21,22,27,28} = \frac{b_{15} + b_{16} + b_{21} + b_{22} + b_{27} + b_{28} + b_{33} + b_{34}}{12} + \quad (9)$$

$$\frac{\frac{1}{2}(b_{14} + b_{17} + b_{20} + b_{23} + b_{26} + b_{29} + b_{32} + b_{35})}{12}$$

The arithmetic mean functions of FIGS. 4A, 4B, and 4C, and the weighted mean functions of FIGS. 5A, 5B, and 5C are examples of low pass filter functions of the spatial distribution of the intensities of the image subpixels. These and other low pass filter functions are useful in reducing aliasing when each image subpixel has one of only two intensity levels (either "off" or "on"), and where each display subpixel is capable of being displayed in any one of at least three intensity levels (for example, "off", "medium intensity", and "high intensity") (See for example, Crow, F. C. "The Aliasing Problem in Computer-Generated Shaded Images", *Communications of the ACM*, Vol. 20, No. 11, pages 799–805, November 1977.)

As shown in FIGS. 4A, 4B, and 4C, the first, second, and third regions are T-shaped and have equal areas. In FIGS. 5A, 5B, and 5C, the first, second, and third regions are rectangularly shaped and again have equal areas. Within the scope of the present invention, the regions 48–58 may alternatively have other shapes, so long as each region is approximately centered on the position of the associated display subpixel.

While the regions 48–58 may have shapes other than those shown, in subjective comparisons between the T-shaped regions and the rectangular regions, most people reported that the rectangular regions produced images of slightly higher quality than the centered T-shaped regions.

Figure 6:
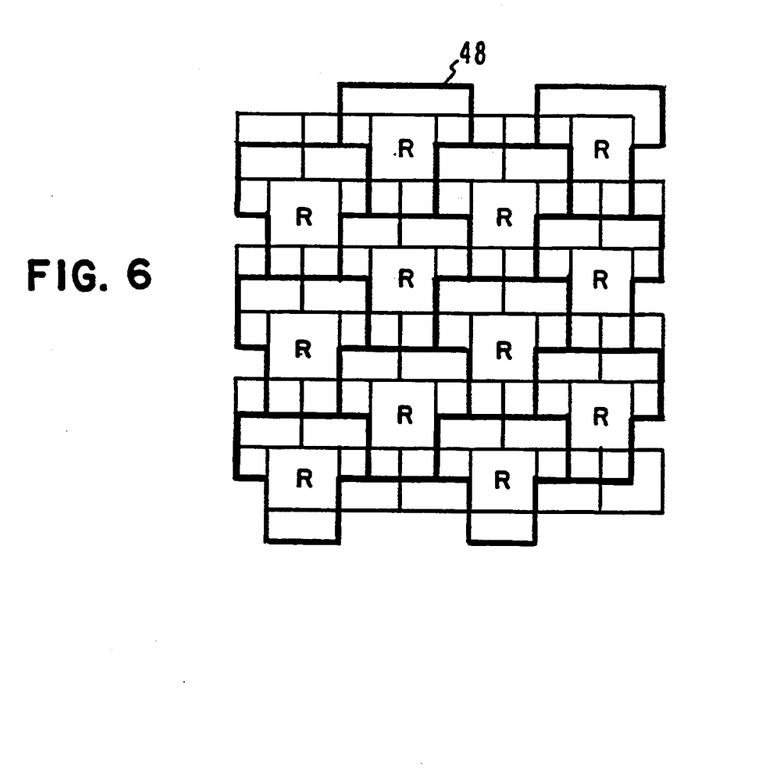
FIG. 6 schematically shows several first display subpixels (in this case red subpixels), and a space-filling pattern of associated first regions.

While FIGS. 4A, 4B, 4C, 5A, 5B, and 5C, each show one region associated with one display subpixel, FIG. 6 shows a number of first regions 48 associated with a number of first display subpixels (here, R subpixels). As shown in FIG. 6, each first region 48 is centered on an associated R display subpixel, and has an area substantially equal to the area of an entire display pixel containing three display subpixels. While FIG. 6 shows only a portion of the entire display, it can be seen that the combination of all of the first regions 48 extends over substantially the entire display. Moreover, it can be seen that the sum of the areas of all of the first regions 48 is substantially equal to the area of the entire display. In this way, all available image information is utilized in constructing the display of the image.

Thus far, each display pixel 44 has been described as comprising three display subpixels 46. (FIG. 2). However, each display pixel may contain more than three display subpixels, or may contain as few as two display subpixels.

Figure 7:
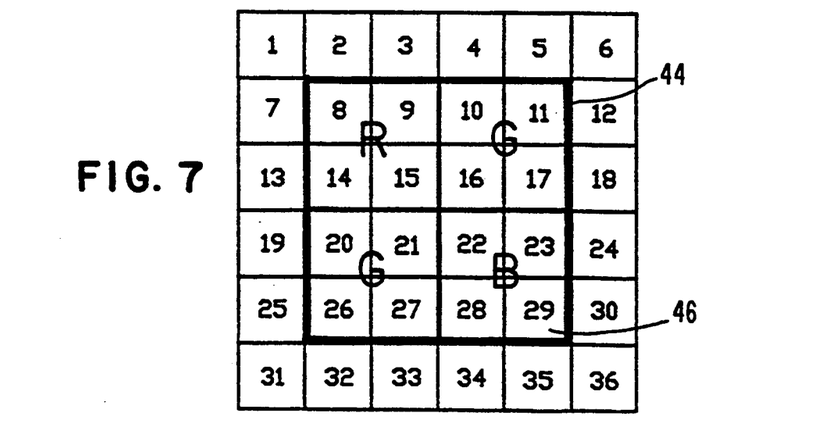
FIG. 7 shows a display pixel comprising four display subpixels.

FIG. 7 shows a display pixel 44 containing four display subpixels 46. In this embodiment, each display pixel 44 contains one red display subpixel R, one blue display subpixel B, and two green display subpixels G. The green display subpixels may be of the same wavelength or of different wavelengths. Moreover, one green display subpixel may be replaced, for example, by a gray display subpixel.

Figure 8:
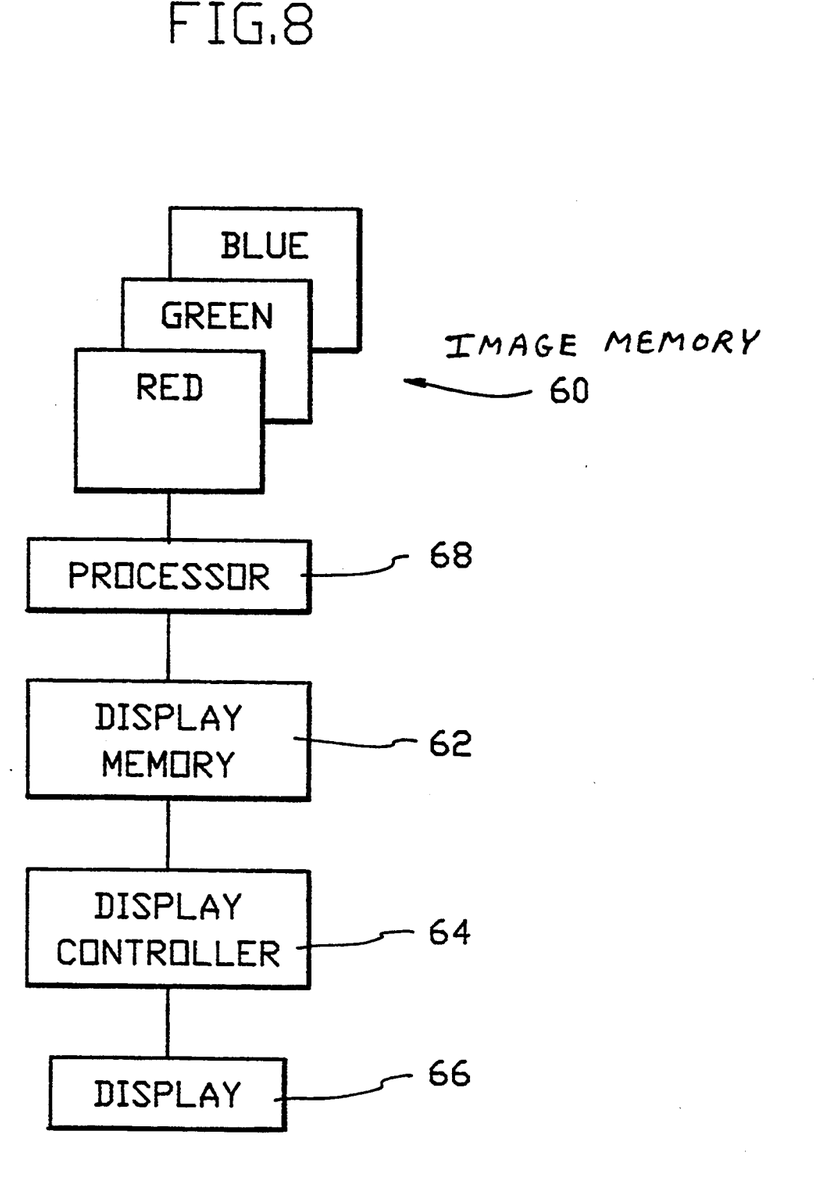
FIG. 8 schematically shows an apparatus for performing the method of displaying a multicolor image according to the present invention.

FIG. 8 is a block diagram of an apparatus for performing the method of displaying a multicolor image according to the present invention. The apparatus includes, for example, an image memory 60 which separately stores red image information, green image information, and blue image information. The apparatus further includes a display memory 62 for storing display information corresponding to the intensities of the red, green, and blue display subpixels. A display controller 64 reads the information in the display memory 62 and drives a display 66 to produce an image.

The display 66 may be, for example, a plasma display or an electroluminescent display. In both of these displays, the display subpixels emit light. Alternatively, the display 66 may be a liquid crystal device in which the display subpixels transmit and/or reflect light incident thereon, or it may be a multicolor printer.

The apparatus of FIG. 8 further includes a processor 68 for reading the image information in image memory 60 and for generating the display information in the display memory 62. Processor 68 reads image subpixel intensity information from image memory 60 locations corresponding to regions (for example, regions 48–52 of FIGS. 4A–4C, or regions 54–58 of FIGS. 5A–5C) centered on the positions of associated display subpixels. The image subpixel intensity information in each region is then operated upon (for example, averaged), and the result is stored in the display memory 62 location corresponding to the position of the associated display subpixel.

We claim:

1. A method of displaying a multicolor image, said method comprising the steps of:
   providing an image having a first density of image pixels, each image pixel having a position, each image pixel comprising at least first and second image subpixels, each first image subpixel having a first color, each second image subpixel having a second color different from the first color, each image subpixel having an intensity;
   providing a display having a second density of display pixels less than or equal to the first density of image pixels, each display signal comprising at least first and second spatially offset display subpixels, each first display subpixel being capable of displaying the first color, each second display subpixel being capable of displaying the second color, each display subpixel having a position and an area, each display subpixel corresponding to an area of the display;
   displaying a first display subpixel with an intensity which is a function of the intensities of at least two first image subpixels having positions extending over a first region, said first region being approximately centered on the position of the first display subpixel, said first region having an area greater than the area of the first display subpixel; and
   displaying a second display subpixel with an intensity which is a function of the intensities of at least two second image subpixels having positions extending over a second region, said second region being approximately centered on the position of the second display subpixel, said second region having an area greater than the area of the second display subpixel.

2. A method as claimed in claim 1, characterized in that:
   each image subpixel has one of only two intensity levels; and
   each display subpixel is capable of being displayed in any one of at least three intensity levels.

3. A method as claimed in claim 2, characterized in that:
   each first display subpixel is displayed with an intensity which is a first function of the intensities of at least two first image subpixels having positions extending over a first region associated with the first display subpixel, each first region having an area greater than the area of the associated first display subpixel, each first region being approximately centered on the position of the associated first display subpixel; and
   each second display subpixel is displayed with an intensity which is a second function of the intensities of at least two second image subpixels having positions extending over a second region associated with the second display subpixel, each second region having an area greater than the area of the associated second display subpixel, each second region being approximately centered on the position of the associated second display subpixel.

4. A method as claimed in claim 3, characterized in that:
   each image pixel further comprises a third image subpixel, each third image subpixel having a third color different from the first and second colors;

each display pixel further comprises a third display subpixel spatially offset from the first and second display subpixels, each third display subpixel being capable of displaying the third color; and the method further comprises the step of displaying each third display subpixel with an intensity which is a third function of the intensities of at least two third image subpixels having positions extending over a third region associated with the third display subpixel, each third region having an area greater than the area of the associated third display subpixel, each third region being approximately centered on the position of the associated third display subpixel.

5. A method as claimed in claim 4, characterized in that the first, second, and third regions are T-shaped and have equal areas.

6. A method as claimed in claim 4, characterized in that the first, second, and third regions are rectangularly shaped and have equal areas.

7. A method as claimed in claim 4, characterized in that the first, second, and third regions have equal areas.

8. A method as claimed in claim 4, characterized in that the first, second, and third functions are weighted arithmetic mean functions.

9. A method as claimed in claim 4, characterized in that the steps of displaying the display subpixels comprise the steps of energizing the display subpixels to emit light.

10. A method as claimed in claim 4, characterized in that the steps of displaying the display subpixels comprise the steps of energizing the display subpixels to reflect light incident thereon.

11. A method as claimed in claim 4, characterized in that the steps of displaying the display subpixels comprise the steps of energizing the display subpixels to transmit light incident thereon.

12. A method as claimed in claim 4, characterized in that:
the intensity of the first display subpixel is equal to a low-pass filter function of the spatial distribution of the intensities of the first image subpixels in the first region;
the intensity of the second display subpixel is equal to a low-pass filter function of the spatial distribution of the intensities of the first image subpixels in the second region; and
the intensity of the third display subpixel is equal to a low pass filter function of the spatial distribution of the intensities of the first image subpixels in the third region.

13. A method as claimed in claim 3, characterized in that the first and second image subpixels are spatially superimposed on each other.

14. A method as claimed in claim 3, characterized in that the second density of display pixels is less than the first density of image pixels.

15. A method as claimed in claim 3, characterized in that:
the display has an area;
each display pixel has an area, the area of one display pixel being substantially equal to the area of each other display subpixel, the sum of the areas of the display pixels being substantially equal to the display area;
each first region has an area substantially equal to the area of a display pixel;
each second region has an area substantially equal to the area of a display pixel;
a combination of all of the first regions extends over substantially the entire display;
a combination of all of the second regions extends over substantially the entire display;
the sum of the areas of all of the first regions is substantially equal to the display area; and
the sum of the areas of all of the second regions is substantially equal to the display area.

16. A method as claimed in claim 1, characterized in that:
each first display subpixel is displayed with an intensity which is a first function of the intensities of at least two first image subpixels having positions extending over a first region associated with the first display subpixel, each first region having an area greater than the area of the associated first display subpixel, each first region being approximately centered on the position of the associated first display subpixel; and
each second display subpixel is displayed with an intensity which is a second function of the intensities of at least two second image subpixels having positions extending over a second region associated with the second display subpixel, each second region having an area greater than the area of the associated second display subpixel, each second region being approximately centered on the position of the associated second display subpixel.

17. A method as claimed in claim 16, characterized in that:
each image pixel further comprises a third image subpixel, each third image subpixel having a third color different from the first and second colors;
each display pixel further comprises a third display subpixel spatially offset from the first and second display subpixels, each third display subpixel being capable of displaying the third color; and
the method further comprises the step of displaying each third display subpixel with an intensity which is a third function of the intensities of at least two third image subpixels having positions extending over a third region associated with the third display subpixel, each third region having an area greater than the area of the associated third display subpixel, each third region being approximately centered on the position of the associated third display subpixel.

18. A method as claimed in claim 17, characterized in that the first, second, and third regions are T-shaped and have equal areas.

19. A method as claimed in claim 17, characterized in that the first, second, and third regions are rectangularly shaped and have equal areas.

20. A method as claimed in claim 17, characterized in that the first, second, and third regions have equal areas.

21. A method as claimed in claim 17, characterized in that the first, second, and third functions are weighted arithmetic mean functions.

22. A method as claimed in claim 17, characterized in that the steps of displaying the display subpixels comprise the steps of energizing the display subpixels to emit light.

23. A method as claimed in claim 17, characterized in that the steps of displaying the display subpixels comprise the steps of energizing the display subpixels to reflect light incident thereon.

24. A method as claimed in claim 17, characterized in that the steps of displaying the display subpixels comprise the steps of energizing the display subpixels to transmit light incident thereon.

25. A method as claimed in claim 17, characterized in that:
the intensity of the first display subpixel is equal to a low-pass filter function of the spatial distribution of the intensities of the first image subpixels in the first region;
the intensity of the second display subpixel is equal to a low-pass filter function of the spatial distribution of the intensities of the first image subpixels in the second region; and
the intensity of the third display subpixel is equal to a low pass filter function of the spatial distribution of the intensities of the first image subpixels in the third region.

26. A method as claimed in claim 16, characterized in that
each image pixel further comprises a fourth image subpixel, each fourth image subpixel having a fourth color different from the first, second, and third colors;
each display pixel further comprises a fourth display subpixel spatially offset from the first, second, and third display subpixels, each fourth display subpixel being capable of displaying the fourth color; and
the method further comprises the step of displaying each fourth display subpixel with an intensity which is a fourth function of the intensities of at least two fourth image subpixels having positions extending over a fourth region associated with the fourth display subpixel, each fourth region having an area greater than the area of the associated fourth display subpixel, each fourth region being approximately centered on the position of the associated fourth display subpixel.

27. A method as claimed in claim 16, characterized in that the first and second image subpixels are spatially superimposed on each other.

28. A method as claimed in claim 16, characterized in that the second density of display pixels is less than the first density of image pixels.

29. An apparatus for displaying a multicolor image, said apparatus comprising:
means for providing image information corresponding to an image having a first density of image pixels, each image pixel having a position, each image pixel comprising at least first and second image subpixels, each first image subpixel having a first color, each second image subpixel having a second color different from the first color, each image subpixel having an intensity;
a display having a second density of display pixels less than or equal to the first density of image pixels, each display pixel comprising at least first and second spatially offset display subpixels, each first display subpixel being capable of displaying the first color, each second display subpixel being capable of displaying the second color, each display subpixel having a position and an area, each display subpixel corresponding to an area of the display;
means for displaying a first display subpixel with an intensity which is a function of the intensities of at least two first image subpixels having positions extending over a first region, said first region being approximately centered on the position of the first display subpixel, said first region having an area greater than the area of the first display subpixel; and
means for displaying a second display subpixel with an intensity which is a function of the intensities of at least two second image subpixels having positions extending over a second region, said second region being approximately centered on the position of the second display subpixel, said second region having an area greater than the area of the second display subpixel.

30. An apparatus as claimed in claim 29, characterized in that:
the means for providing image information comprises an image memory for storing image information;
each image subpixel has one of only two intensity levels; and
each display subpixel is capable of being displayed in any one of at least three intensity levels.

31. An apparatus as claimed in claim 30, characterized in that:
each first display subpixel is displayed with an intensity which is a first function of the intensities of at least two first image subpixels having positions extending over a first region associated with the first display subpixel, each first region having an area greater than the area of the associated first display subpixel, each first region being approximately centered on the position of the associated first display subpixel; and
each second display subpixel is displayed with an intensity which is a second function of the intensities of at least two second image subpixels having positions extending over a second region associated with the second display subpixel, each second region having an area greater than the area of the associated second display subpixel, each second region being approximately centered on the position of the associated second display subpixel.

32. An apparatus as claimed in claim 31, characterized in that:
each image pixel further comprises a third image subpixel, each third image subpixel having a third color different from the first and second colors;
each display pixel further comprises a third display subpixel spatially offset from the first and second display subpixels, each third display subpixel being capable of displaying the third color; and
the apparatus further comprises means for displaying each third display subpixel with an intensity which is a third function of the intensities of at least two third image subpixels having positions extending over a third region associated with the third display subpixel, each third region having an area greater than the area of the associated third display subpixel, each third region being approximately centered on the position of the associated third display subpixel.

33. An apparatus as claimed in claim 32, characterized in that the first, second, and third regions are T-shaped and ave equal areas.

34. An apparatus as claimed in claim 32, characterized in that the first, second, and third regions are rectangularly shaped and have equal areas.

35. An apparatus as claimed in claim 32, characterized in that the first, second, and third regions have equal areas.

36. An apparatus as claimed in claim 32, characterized in that the first, second, and third functions are weighted arithmetic mean functions.

37. An apparatus as claimed in claim 32, characterized in that the means for displaying the display subpixels comprises means for energizing the display subpixels to emit light.

38. An apparatus as claimed in claim 32, characterized in that the means for displaying the display subpixels comprises means for energizing the display subpixels to reflect light incident thereon.

39. An apparatus as claimed in claim 32, characterized in that the means for displaying the display subpixels comprises means for of energizing the display subpixels to transmit light incident thereon.

40. An apparatus as claimed in claim 32, characterized in that:

the intensity of the first display subpixel is equal to a low-pass filter function of the spatial distribution of the intensities of the first image subpixels in the first region;

the intensity of the second display subpixel is equal to a low-pass filter function of the spatial distribution of the intensities of the first image subpixels in the second region; and the intensity of the third display subpixel is equal to a low pass filter function of the spatial distribution of the intensities of the first image subpixels in the third region.

41. An apparatus as claimed in claim 31, characterized in that the first and second image subpixels are spatially superimposed on each other.

42. All apparatus as claimed in claim 31, characterized in that the second density of display pixels is less than the first density of image pixels.

43. An apparatus as claimed in claim 31, characterized in that:

the display has an area;

each display pixel has an area, the area of one display pixel being substantially equal to the area of each other display subpixel, the sum of the areas of the display pixels being substantially equal to the display area;

each first region has an area substantially equal to the area of a display pixel;

each second region has an area substantially equal to the area of a display pixel;

a combination of all of the first regions extends over substantially the entire display;

a combination of all of the second regions extends over substantially the entire display;

the sum of the areas of all of the first regions is substantially equal to the display area; and the sum of the areas of all of the second regions is substantially equal to the display area.

* * * * *